(12) United States Patent
Hird

(10) Patent No.: US 8,510,817 B1
(45) Date of Patent: *Aug. 13, 2013

(54) TWO-FACTOR ANTI-PHISHING AUTHENTICATION SYSTEMS AND METHODS

(75) Inventor: Geoffrey Hird, Sunnyvale, CA (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/196,780

(22) Filed: Aug. 2, 2011

Related U.S. Application Data

(63) Continuation of application No. 12/272,489, filed on Nov. 17, 2008, now Pat. No. 8,015,598.

(60) Provisional application No. 60/988,526, filed on Nov. 16, 2007.

(51) Int. Cl.
 G06F 7/04 (2006.01)
 G06F 15/16 (2006.01)
 G06F 17/30 (2006.01)
 H04L 29/06 (2006.01)

(52) U.S. Cl.
 USPC ............... 726/7; 726/28; 726/4; 726/5; 726/6

(58) Field of Classification Search
 USPC .......................................... 726/7, 28, 4, 5, 6
 See application file for complete search history.

(56) References Cited

U.S. PATENT DOCUMENTS

| | | | |
|---|---|---|---|
| 5,928,363 A * | 7/1999 | Ruvolo ........................... | 726/22 |
| 6,910,136 B1 | 6/2005 | Wasserman et al. | |
| 7,020,645 B2 | 3/2006 | Bisbee et al. | |
| 7,100,049 B2 * | 8/2006 | Gasparini et al. ............. | 713/170 |
| 7,200,576 B2 * | 4/2007 | Steeves et al. .................. | 705/64 |
| 7,263,205 B2 * | 8/2007 | Lev ................................. | 382/100 |
| 7,266,693 B1 * | 9/2007 | Potter et al. .................... | 713/169 |
| 8,015,598 B2 * | 9/2011 | Hird ................................. | 726/7 |
| 2005/0235351 A1 | 10/2005 | Seltzer et al. | |
| 2007/0022473 A1 * | 1/2007 | Hird ................................. | 726/9 |
| 2007/0174338 A1 * | 7/2007 | Liggett ...................... | 707/104.1 |
| 2007/0245027 A1 | 10/2007 | Ghosh et al. | |
| 2007/0250885 A1 * | 10/2007 | Ohashi ........................ | 725/106 |
| 2008/0028444 A1 | 1/2008 | Loesch et al. | |
| 2009/0165109 A1 | 6/2009 | Hird | |

OTHER PUBLICATIONS

Chongo (113839), CRYTPOcard DoS issue, Nov. 3, 2004, retreived from the Internet at http://ask.slashdot.org/comments.pl?sid=23189 &cid=2515877 on Sep. 14, 2005, 3 pages.
Parno et al., "Phoolproof Phishing Prevention", Proc. Financial Cryptography and Data Security, Springer-Verlag, 2006, pp. 1-19.
RSA Security Inc., "RSA SecurID® Authentication, A Better Value for a Better ROI", 2001, 12 pages Bedford, MA.

* cited by examiner

*Primary Examiner* — Kambiz Zand
*Assistant Examiner* — Aubrey Wyszynski
(74) *Attorney, Agent, or Firm* — Vierra Magen Marcus LLP

(57) ABSTRACT

A computerized method of providing access to a secure resource includes, to each of a plurality of authorized users, providing a link to the secure resource. Each link includes a unique password embedded therein and each unique password relates to a particular user identification (userID) and personal identification number (PIN). The method also includes receiving a request to access the resource using a link having a password embedded therein, which request originates at a web browser. The method further includes directing the browser to a login screen and receiving via the login screen a userID and PIN. The method also includes determining whether the userID and PIN relate to one another and to the password and allowing or denying access to the resource in accordance with the determination.

17 Claims, 4 Drawing Sheets

TWO-FACTOR ANTI-PHISHING AUTHENTICATION SYSTEMS AND METHODS

CROSS-REFERENCES TO RELATED APPLICATIONS

This application is a continuation of U.S. Non-Provisional patent application Ser. No. 12/272,489, filed Nov. 17, 2008, now U.S. Pat. No. 8,015,598 which is the nonprovisional of, and claims the benefit of, U.S. Provisional Patent Application No. 60/988,526, filed Nov. 16, 2007, entitled "Two-Factor Anti-Phishing Authentication Systems and Methods," the entirety of which is herein incorporated by reference for all purposes.

This application is related to U.S. patent application Ser. No. 12/272,205, filed Nov. 17, 2008, entitled "Controlled Client-Side Authentication Module Systems and Methods," which is a non-provisional of, and claims the benefit of, U.S. Provisional Patent Application No. 60/988,502, filed Nov. 16, 2007, and also to U.S. Published Patent Application No. 2007/0022473, entitled "Server-Token Lockstep Systems and Methods," the entirety of which applications are incorporated herein by reference for all purposes.

FIELD OF THE INVENTION

Embodiments of the present invention relate generally to electronic security. More specifically, embodiments of the present invention relate to systems and methods to protect electronic resources by thwarting fraudulent attempts to gain access thereto.

BACKGROUND OF THE INVENTION

With the widespread use of the Internet, attempts to defraud people have also increased. Thus it is vital to develop strong authentication techniques. Two prevalent fraud attempts are phishing and man-in-the-middle (MITM) attacks. Phishing involves the non-real-time collection of usernames and passwords and other sensitive data. These data could later be used by the attacker to defraud users. MITM can be described as phishing plus real-time proxying. Several solutions are available for phishing and MITM attacks.

Potter et al. (E. R. Potter and P. M. Skirvin, "Validated Mutual Authentication", U.S. Pat. No. 7,266,693, Sep. 4, 2007) teach authentication using fractal images. The user, while registering chooses a fractal image from out of a number of images. Subsequently, during each transaction the user wants to perform, (s)he will be provided with a list of images from which the user is required to choose the right one.

Lev (Z. H. Lev, "System and Method of Generic Symbol Recognition and User Authentication Using a Communication Device with Imaging Capabilities", U.S. Pat. No. 7,263,205, Aug. 28, 2007) presents a method for a user with an imaging device to send digital information appearing on a screen or in print to a remote server. The digital image that has authentication data will then be processed by image processing software to validate the user.

Steeves et al. (D. J. Steeves and M. W. Snyder, "Secure Online Transactions Using a Captcha Image as a Watermark", U.S. Pat. No. 7,200,576, Apr. 3, 2007) teach supplying a user with a device that is capable of generating identifiers from a user-specific key. When the user wants to conduct a transaction, (s)he contacts the transaction provider. The transaction provider determines an identifier that should be currently generated by the user's device. It creates a captcha image of the identifier and watermarks a transaction verification page with this captcha image. The user is then sent this page and asked to provide the next identifier her/his device generates. If the user is successful in sending the correct identifier, the transaction is verified. Otherwise the transaction is rejected.

Gasparini et al. (L. A. Gasparini and C. E. Gotlieb, "Method and Apparatus for Authentication of Users and Websites", U.S. Pat. No. 7,100,049, Aug. 29, 2006) propose a method of mutual authentication. For example, when a user requests a page from a website, customization information that can be recognized by the user is sent to the user. The user then checks if the page is the right one. Also, the website examines a signed and encrypted cookie stored on the user's system to validate the user.

The aforementioned techniques are fairly involved and are quite expensive to implement. They all have weaknesses, and the user remains vulnerable to social engineering attacks. There is, therefore, a need for more robust solutions for phishing and MITM attacks with respect to ease of implementation, cost of implementation, level of security, and/or the like.

SUMMARY OF THE INVENTION

Embodiments of the present invention relate to a computerized method of providing access to a secure resource. The method includes, to each of a plurality of authorized users, providing a link to the secure resource. Each link includes a unique password embedded therein and each unique password relates to a particular user identification (userID) and personal identification number (PIN). The method also includes receiving a request to access the resource using a link having a password embedded therein. The request originates at a web browser. The method further includes directing the browser to a login screen and receiving via the login screen a userID and PIN. The method also includes determining whether the userID and PIN relate to one another and to the password. The method further includes allowing or denying access to the resource in accordance with the determination. In some embodiments, providing the link may include sending the link as an email attachment or as a file stored on a USB drive.

Other embodiments provide a computerized method of providing access to a secure resource. The method includes, to each of a plurality of authorized users, providing a link to the secure resource. Each link includes a unique password embedded therein and each unique password relates to a particular user identification (userID) and personal identification number (PIN). The method also includes receiving a request to access the resource using a link not having a password embedded therein. The request originates at a web browser. The method further includes directing the browser to a login screen and receiving via the login screen a userID and PIN. The method also includes determining that the userID and PIN relate to a user also having a password. The method further includes directing the user to login via a bookmark having the password. The method includes receiving a subsequent request to access the resource using a link having a password embedded therein, directing the browser to the login screen, and receiving via the login screen the userID and PIN. The method also includes determining whether the userID and PIN relate to one another and to the password and allowing or denying access to the resource in accordance with the determination.

Still other embodiments provide a computerized method of providing access to a secure resource. The method includes a custodian of the resource providing to each of a plurality of authorized users a link to the secure resource. Each link includes a unique password embedded therein and each unique password relates to a particular user identification (userID) and personal identification number (PIN). The method further includes an unauthorized user obtaining a userID and password from an authorized user, the unauthorized user attempting to access the resource without providing the embedded password, and the custodian directing the unauthorized user to attempt to access the resource using link having the password.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
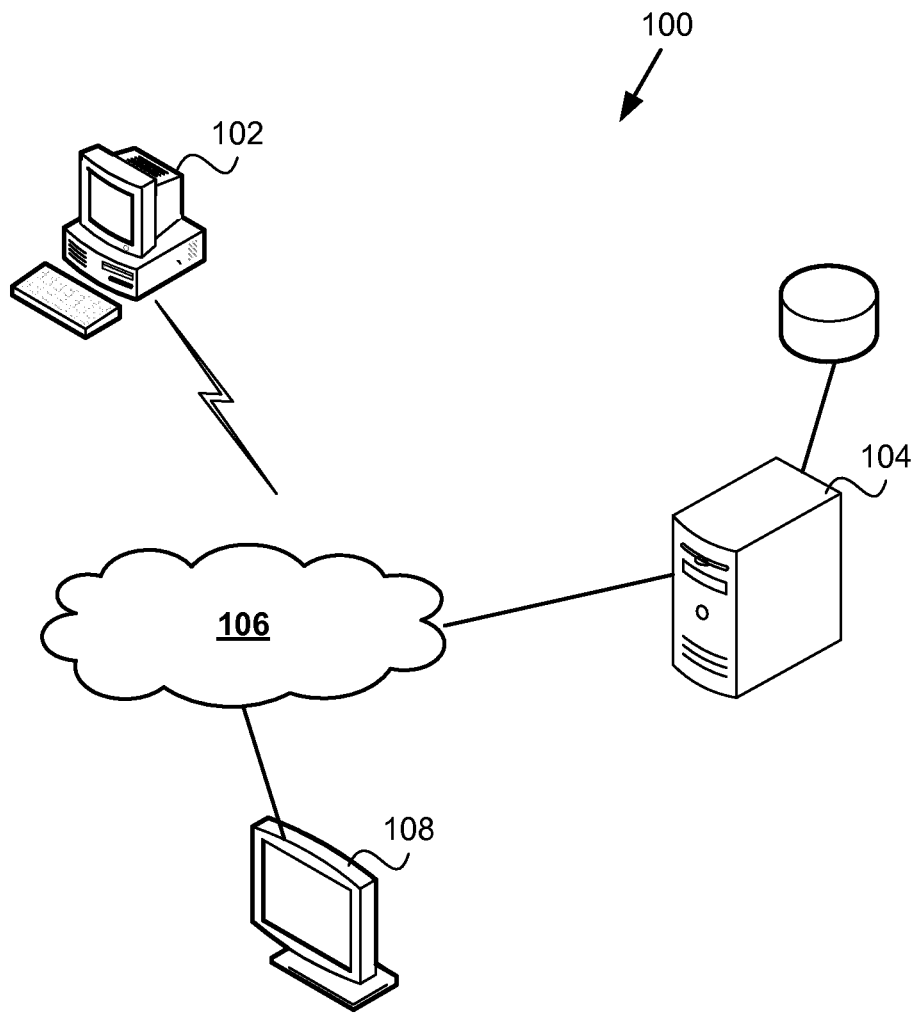
FIG. 1 illustrates an exemplary system within which embodiments of the invention may be implemented.

Embodiments of the present invention relate to electronic security generally and to Internet security specifically. In order to provide a context for describing embodiments of the present invention, embodiments of the invention will be described herein with reference to a user logging into a bank website. Those skilled in the art will recognize, however, that the present invention is not limited to such embodiments.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Phishing and MITM attacks prey on users making poor judgments, induced to do so through trickery. Embodiments of the present invention are directed toward preventing these attacks by removing user judgment from the process. According to embodiments of the invention, the user (herein also "customer," or "consumer") is provided a bookmark with which to log into a secure site. The bookmark comprises a URL having a web address for a secure site and a password. The bookmark serves to bind the act of going to a website and presenting a password into an indivisible unit, thereby making phishing impossible. Upon following the bookmark, the user is taken to a web page that requests, in addition, the user's userID and personal identification number (PIN). If the provided PIN and the password portion of the URL do not match corresponding stored values for the userID, then the user is not allowed to access the site. Importantly, the user will recognize an attempt to obtain the URL as a possible fraud attack and be reluctant to provide it. The foregoing is referred to herein as "Login Via Bookmarks," or LVB. It is a method of accomplishing two-factor anti-phishing authentication using bookmarks.

Having described embodiments of the invention generally, attention is directed to FIG. 1, which depicts an exemplary system 100 according to embodiments of the invention. Those skilled in the art will appreciate that the system 100 is merely exemplary of a number of possible system embodiments. The system 100 includes a user computer 102 and a secure resource 104 that the user desires to access via a network 106. The secure resource 104 includes a database of user records, each having a user ID, password, and PIN. Passwords are provided to the secure server via a URL contained in a bookmark. The user's userID and PIN are supplied via a web page rendered on the user computer 102.

The system 100 may include a fraudster's computer 108. The fraudster may attempt to acquire the user's secure information via an MITM attack or via phishing. According to embodiments of the invention, however, both attempts would fail to obtain the user's password unless the user sends a copy of the bookmark containing the password to the fraudster.

Figure 2:
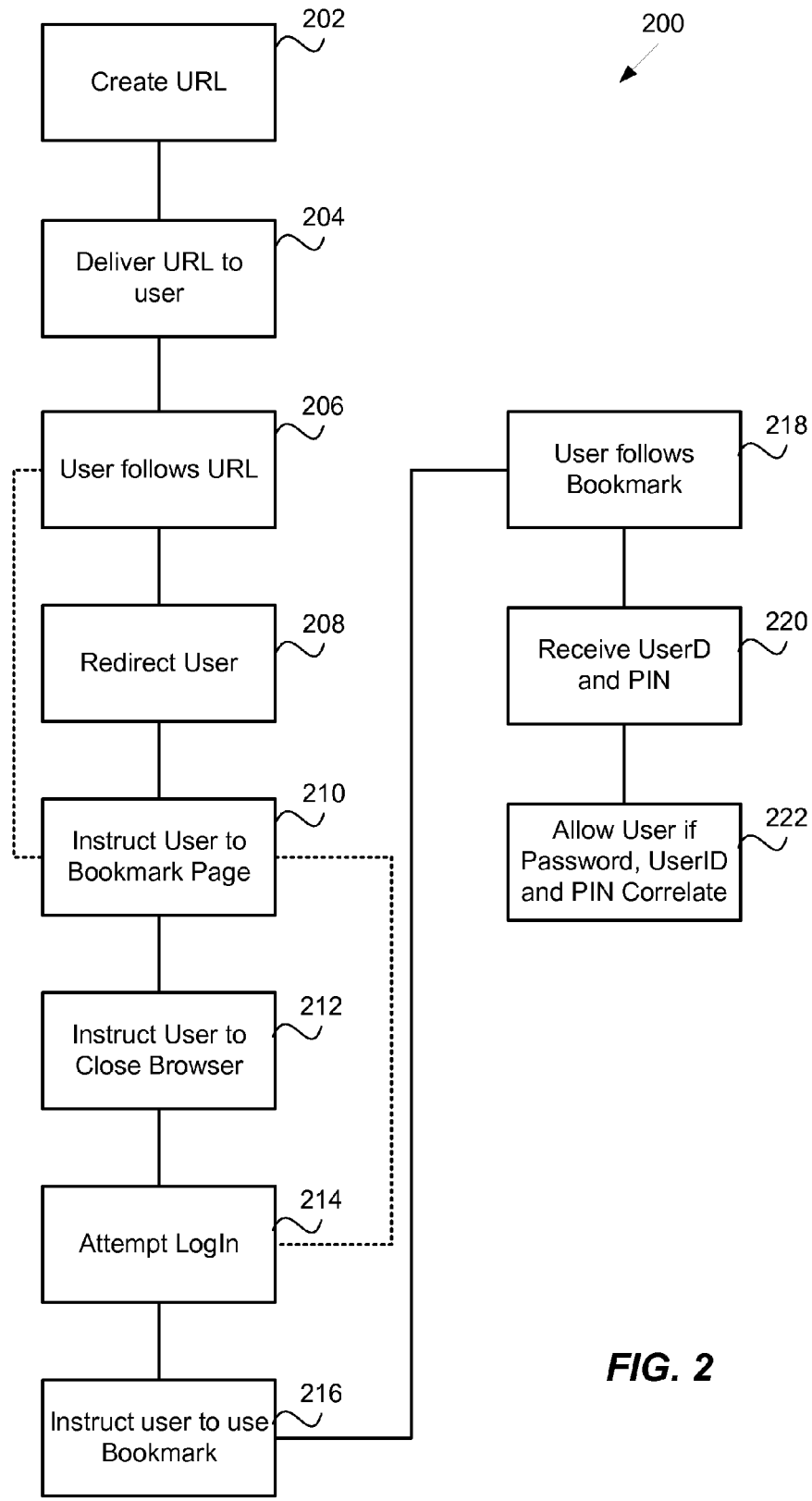
FIG. 2 depicts an exemplary method according to embodiments of the present invention, which method may be implemented in the system of FIG. 1.

Having described a system according to embodiments of the invention, attention is directed to FIG. 2, which depicts an exemplary method 200 according to embodiments of the invention. The method may be implemented in the system 100 of FIG. 1 or other appropriate system. Those skilled in the art will appreciate that the method 200 is merely exemplary of a number of possible method embodiments and that other exemplary methods may include more, fewer, or different steps than those illustrated and described herein.

The method begins at block 202 at which location a secure site, a bank in this exemplary embodiment, creates a URL having both a website address and a password. The password is unique to each user and is coupled to the user's userID and PIN. In a specific embodiment, the password is a 16 character, second factor password, and the PIN is user definable or re-definable.

At block 204, the URL is delivered to the user in any of a number of ways. For example, the bank (i.e., custodian of the secure resource) may send the URL to the user in an email that instructs the user to follow the URL. An exemplary URL is:

https://www.anybank.comilvb?user=foo&secondfactor=2ea5f800cd8d4b75

At block 206, the user follows the URL and may be instructed to bookmark the page. In another embodiment, the user is redirected to a different page at block 208 via a URL having a different password. Hence, the password in the emailed URL is no longer applicable. In either case, the user is instructed to bookmark the page at block 210. In some embodiments, the user is instructed to close her browser and follow the bookmark to thereby train the user to access the page via the bookmark. This takes place at block 212.

In some embodiments, the URL is provided to the user on a portable storage medium, such as a USB fob. The URL may be included in a bookmark, such as a Microsoft IE "exported bookmarks" file. The user may then "import" the bookmark. Alternatively, the USB fob could contain a small executable that, when run, creates a bookmark. In still other embodiments, an activation code, communicated out of band, could be used during a first-time login, to release the above URL, with instructions to bookmark it.

At block 214, the user attempts to log into the site by, for example, following a link to the www.<anybank>.com website. The site recognizes the user's attempt to log in and instructs her to use the saved bookmark at block 216. The user's session context may be preserved using, for example, cookies. If the user does not use the bookmark, she has no way of logging in.

At block 218, the user follows the saved bookmark and is prompted to enter her userID and PIN at block 220. The password component of the URL, together with the PIN, are checked by the server against values stored in a database at block 222. Upon completion of authentication, the user's session continues as smoothly as for any other login technology, even though the bookmarked URL has been used.

If the user is being phished (or MITM-attacked), and is really at a different web site (e.g., wwW.anybank.com), she is unable to reveal her long password to the phishers. She would have to be cajoled into copying the URL value of the saved link and pasting it into the phisher's web page. This is unlikely because getting access to the link data is a rather elaborate and messy thing to do during a banking session.

Moreover, most users would not be able to copy and paste the value of a bookmarked link even if they wanted to. If the user is savvy enough to copy it, she is also savvy enough to know what the point of the link is, and know that something is amiss.

Nevertheless, additional measures may be employed to prevent copying. For example, in some embodiments a URL may be used that is too long to fit into a copy buffer. In other embodiments, "NEVER COPY THIS," or the like, could be interspersed with the password characters.

In some embodiments, the user's userID is included in the saved link, but the user may nevertheless be instructed to enter it again in case she has unintentionally selected a different family member's bookmark for the same site.

In some embodiments, any cookies from a preliminary browsing session, before login, are sent with the saved-link login, even if the user has closed the original browser/tab. Thus the login context continues transparently.

Embodiments of the invention also may be employed for roaming users. For example, a bookmark on a USB fob allows users to access the site using different computers. Procedures could be employed to counter attacks by malware or the like configured to capture bookmarks.

Figure 3A:
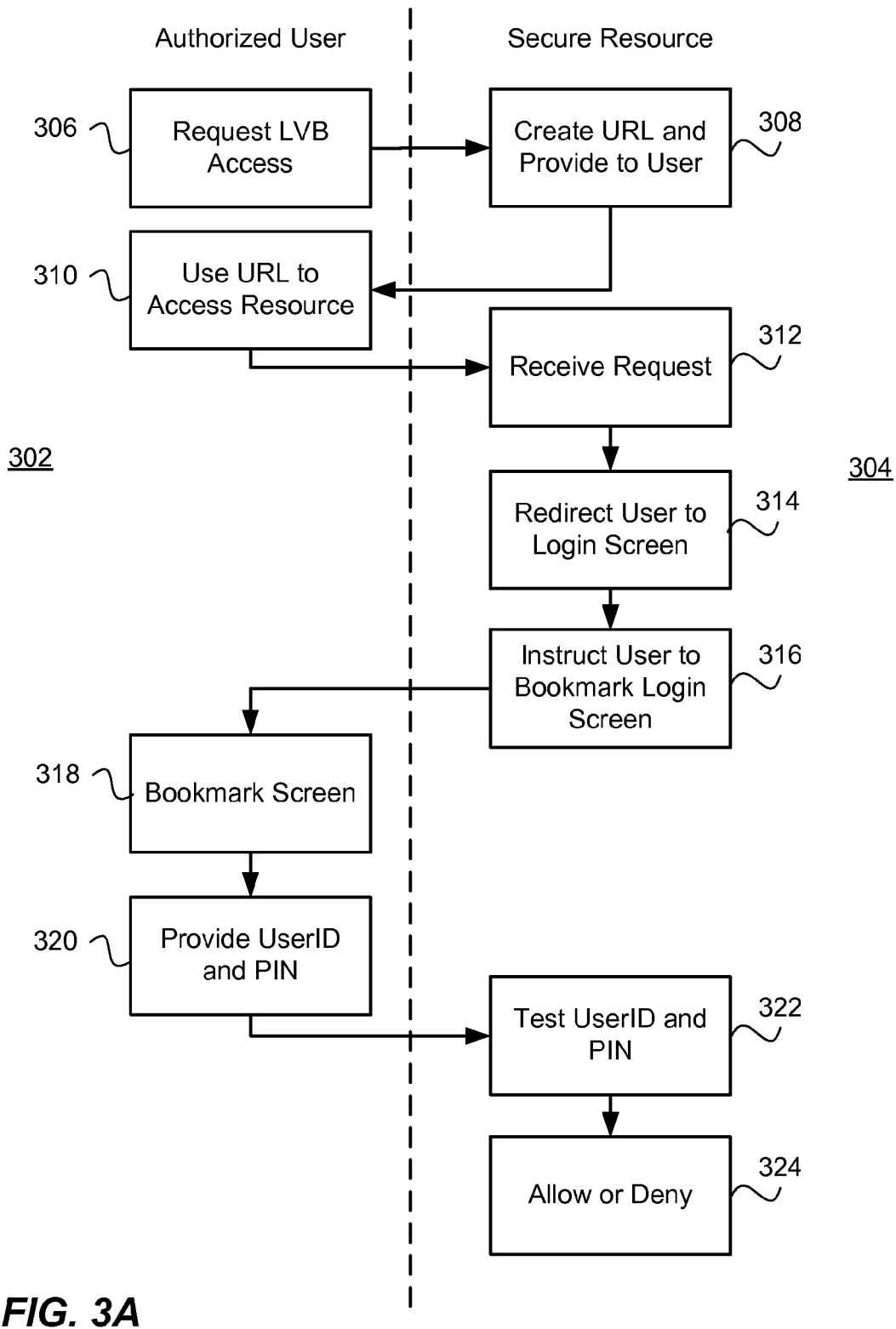
FIGS. 3A-C depict various "swim" diagrams depicting various embodiments of the present invention.
Figure 3B:
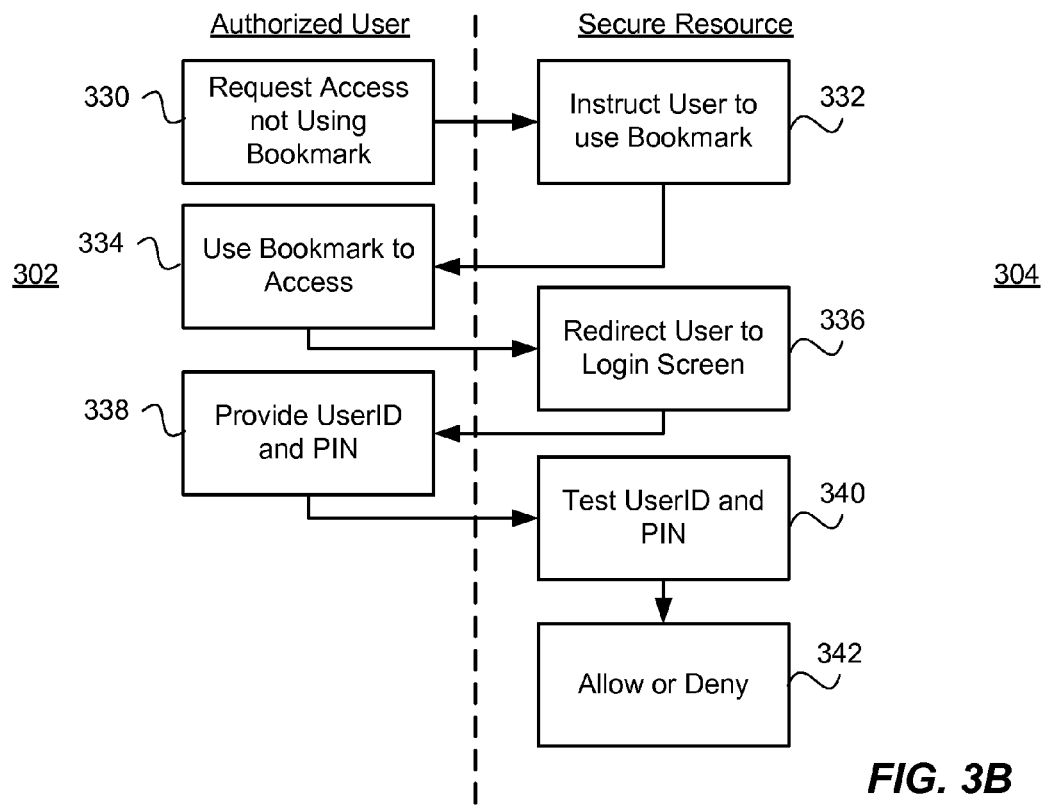
Figure 3C:
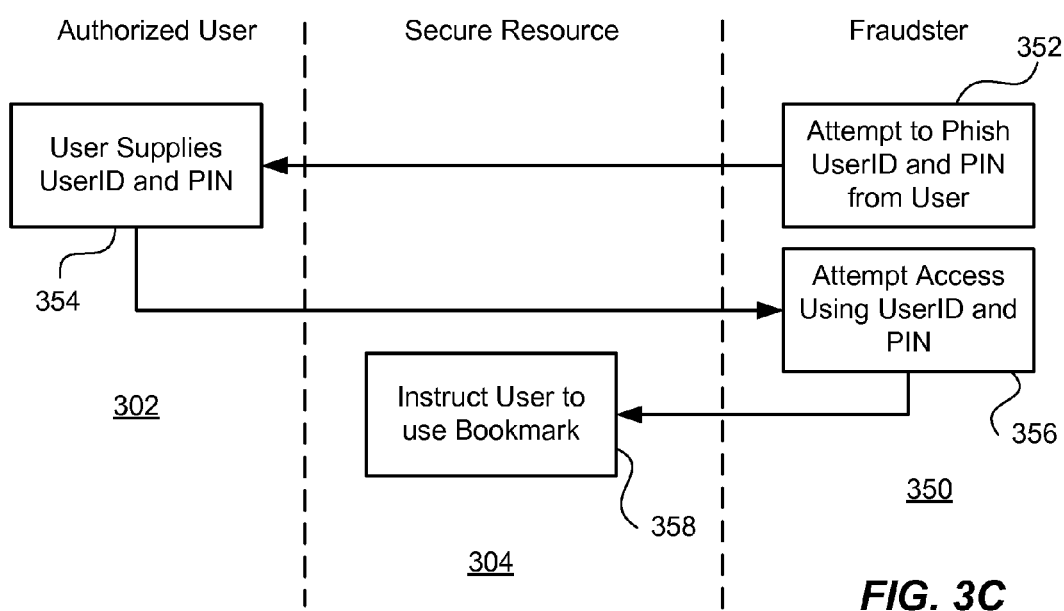

Attention is directed to FIGS. 3A-3C, which include swim diagrams depicting embodiments of the present invention and interactions among various participants. The swim diagram of FIG. 3A depicts actions by an authorized user 302 and a secure resource 304. The authorized user may be using a web browser to access the secure resource, which may be a server, for example. At block 306, an authorized user requests access to or enrollment into "login via bookmark." At block 308, the operator of the secure resource creates a URL having a password embedded therein. The operator links the password to the user's userID and PIN by, for example, storing the three together as a record in a database. The operator supplies the URL to the user in any of the aforementioned ways.

At block 310 the user uses the supplied URL to access the resource. The secure resource receives the request at block 312 and identifies it as an initial LVB request. Accordingly, the secure resource directs the user's browser to a login screen at block 314. The secure resource instructs the user to bookmark the login screen at block 316, which the user does at block 318.

At block 320, the user continues the login process by supplying a userID and PIN. At block 322, the secure resource tests the userID and PIN and determines whether they correlate with the password. If so, the user is allowed access; if not, access is denied, both of which are represented by block 324.

FIG. 3B depicts a subsequent attempt by the authorized user to access the secure resource. At block 330, the user attempts to access the resource not using the saved bookmark. This may take place in any of several ways. For example, the secure resource may direct all users to attempt access using links or bookmarks having embedded passwords, or the user may use a login screen that allows access by users who have not enrolled in LVB, in which case the user supplies a userID and possibly a password. At block 332, the secure resource recognizes the user as an LVB user and instructs the user to login via bookmark.

At block 334, the user requests access using a bookmark having a password, the secure resource directs the user's browser to a login screen at block 336, and the user supplies a usedID and PIN at block 338. At block 340, the secure resource tests the user's userID and PIN and allows or denies the user accordingly at block 342.

Continuing with the swim diagram depicted in FIG. 3C, which includes a fraudster 350, the fraudster attempts to obtain the user's userID and PIN at block 352. The user complies at block 354. The fraudster then attempts to access the secure resource at block 356. The secure resource, however, recognizes the userID and/or PIN as being associated with a user enrolled in LVB. Accordingly, the secure resource instructs the requester to login using a bookmark having a password at block 358. Because the fraudster does not know the user's password, however, the fraudster is unable to continue and the resource remains secure.

Compared to other high security solutions, Login Via Bookmarks is easy to manage, understand, and use. Technical support is straightforward for a customer who cannot log in. Many sensible users (including non-technical users) today use a folder of saved bookmarks for their high security websites. This solves two problems: remembering or finding out the correct website domain name (sometimes not a trivial task), and avoiding possible mistyping, which can put one into the clutches of waiting phishers (or MITM attackers). The solution herein is hardly more complicated than that.

The preceding embodiments represent stand-alone solutions that require no browser modification. Other embodiments can be designed into browser programming. For example, a browser could accommodate bookmarks having URL's bound to passwords as disclosed herein. Such bookmarks could be stored apart from other bookmarks and mask the password from the user to thereby allow the user to see only the high-level name of the login target. A button or the like supports import and use of these bookmarks. In other embodiments, the browser could fetch the URL of the login target site, but instead of transmitting the password as part of the URL (corresponding to the GET method of HTTP), the browser could transmit the password using the POST method. Accordingly, the user will not see the password as a part of the URL shown to the user after retrieval. The browser may store the necessary information, integrating it with plugins and other applications, and submitting the password as part of URL retrieval.

Having described several embodiments, it will be recognized by those of skill in the art that various modifications, alternative constructions, and equivalents may be used without departing from the spirit and scope of the invention. Additionally, a number of well-known processes and elements have not been described in order to avoid unnecessarily obscuring the present invention. Accordingly, the above description should not be taken as limiting the scope of the invention, which is defined in the following claims.

What is claimed is:

1. A non-transitory computer-readable medium containing thereon instructions for controlling a processor to perform a method of controlling access to a secure resource, comprising:
    program code for outputting a link to the secure resource, wherein a specific link is specific to one of a plurality of authorized users and includes a unique password as part of the link;
    program code for receiving a request from a browser, wherein the request is an electronic message indicating at least the resource being requested and including at least a submitted password;
    program code for comparing the request and the submitted password to a set of specific links that have associated passwords, so as to determine if there is a match between the request and its submitted password to an outputted specific link and its included unique password;
    program code for outputting a message to a login screen in a format that a browser can be expected to present to the user to allow for logging in for access to the secure resource, wherein the login screen would provide for user input of a user identification data element and a personal identification element;
    program code for receiving a response to the login screen, the response including at least the entered user identification data element and the entered personal identification element;
    program code for accessing a database of user records and for determining if the entered user identification data element and the entered personal identification element match the user associated with the submitted password from the request from the browser; and
    program code for allowing or denying access to the secure resource based on whether or not the program code for accessing determines that there is a match.

2. The non-transitory computer-readable medium of claim 1, wherein the program code for comparing the request and the submitted password is configured to respond with a match indication when there is a match between the request and its submitted password and to respond, when there is not a match, with a request for the user to follow a provided link to enter the user identification data element and the personal identification element, wherein the provided link includes the password from the request.

3. A method of providing access to a secure resource, using a network-connected server capable of sending and receiving data messages between the server and a user client computing device, the method comprising:
    outputting a link to the secure resource, wherein a specific link is specific to one of a plurality of authorized users and includes a unique password as part of the link;
    receiving a request from a browser, wherein the request is an electronic message indicating at least the resource being requested and including at least a submitted password;
    comparing the request and the submitted password to a set of specific links that have associated passwords, so as to determine if there is a match between the request and its submitted password to an outputted specific link and its included unique password;
    outputting a message to a login screen in a format that a browser can be expected to present to the user to allow for logging in for access to the secure resource, wherein the login screen would provide for user input of a user identification data element and a personal identification element;
    receiving a response to the login screen, the response including at least the entered user identification data element and the entered personal identification element;
    accessing a database of user records and for determining if the entered user identification data element and the entered personal identification element match the user associated with the submitted password from the request from the browser; and
    allowing or denying access to the secure resource based on whether or not there is a match.

4. The method of claim 3, wherein comparing the request and the submitted password includes responding with a match indication when there is a match between the request and its submitted password and responding, when there is not a match, with a request for the user to follow a provided link to enter the user identification data element and the personal identification element, wherein the provided link includes the password from the request.

5. The non-transitory computer-readable medium of claim 1, wherein outputting a link to the secure resource includes electronically communicating the link to the user.

6. The non-transitory computer-readable medium of claim 1, wherein outputting a link to the secure resource includes storing the link on a portable storage medium.

7. The non-transitory computer-readable medium of claim 1, wherein outputting a link includes outputting a bookmark including the link.

8. The non-transitory computer-readable medium of claim 1, wherein the program code for outputting a link to the secure resource includes program code for outputting the link to the secure resource in response to receiving an activation code.

9. The method of claim 3, further comprising instructing the user to bookmark the login screen.

10. The method of claim 9, further comprising instructing the user to close their browser and follow the bookmark.

11. The method of claim 3, further comprising instructing the user to close their browser.

12. A computer server for providing access to a secure resource, the computer server comprising:
 a storage medium for storing instructions; and
 a processor coupled to the storage medium, the processor being operable to execute one or more of the instructions to thereby cause the server to:
 output a link to the secure resource, wherein a specific link is specific to one of a plurality of authorized users and includes a unique password as part of the link;
 receive a request from a browser, wherein the request is an electronic message indicating at least the resource being requested and including at least a submitted password;
 compare the request and the submitted password to a set of specific links that have associated passwords, so as to determine if there is a match between the request and its submitted password to an outputted specific link and its included unique password;
 output a message to a login screen in a format that a browser can be expected to present to the user to allow for logging in for access to the secure resource, wherein the login screen would provide for user input of a user identification data element and a personal identification element;
 receive a response to the login screen, the response including at least the entered user identification data element and the entered personal identification element;
 access a database of user records and for determining if the entered user identification data element and the entered personal identification element match the user associated with the submitted password from the request from the browser; and
 allow or deny access to the secure resource based on whether or not there is a match.

13. The computer server of claim 12, wherein comparing the request and the submitted password includes responding with a match indication when there is a match between the request and its submitted password and responding, when there is not a match, with a request for the user to follow a provided link to enter the user identification data element and the personal identification element, wherein the provided link includes the password from the request.

14. The computer server of claim 12, wherein the processor is further operable cause the server to allow access to the secure resource when there is a match and deny access to the secure resource when there is not a match.

15. The computer server of claim 12, wherein the unique password included in the specific link includes a text message interspersed with elements of the password.

16. The computer server of claim 12, wherein the processor is further operable cause the server to preserve the user's session context.

17. The computer server of claim 12, wherein the processor is further operable cause the server to receive cookies from a preliminary browsing session.

* * * * *